United States Patent [19]
Hobbs

[11] Patent Number: 5,205,114
[45] Date of Patent: Apr. 27, 1993

[54] PEANUT COMBINE

[76] Inventor: Oliver K. Hobbs, c/o Hobbs Engineering Company 300 Kenyon Rd., Suffolk, Va. 23434

[21] Appl. No.: 917,187

[22] Filed: Jul. 22, 1992

Related U.S. Application Data

[63] Continuation-in-part of Ser. No. 599,038, Oct. 17, 1990, Pat. No. 5,138,826.

[51] Int. Cl.$^5$ .............................................. A01D 29/00
[52] U.S. Cl. ................................. 56/14.6; 56/327.1; 460/13; 460/76; 460/126
[58] Field of Search ............ 56/327.1, 13.3, 14.6; 460/13, 83, 76, 126, 128, 129, 143, DIG. 904

[56] References Cited

U.S. PATENT DOCUMENTS

| | | | |
|---|---|---|---|
| 3,319,720 | 5/1967 | Hobbs . | |
| 3,545,185 | 12/1970 | Whitfield et al. . | |
| 3,667,599 | 6/1972 | Hobbs | 209/12 |
| 3,693,835 | 9/1972 | Hobbs | 222/55 |
| 3,968,626 | 7/1976 | Hobbs | 53/267 |
| 3,983,683 | 10/1976 | James | 56/364 |
| 3,989,111 | 11/1976 | Hobbs | 171/101 |
| 4,000,747 | 1/1977 | Rodger | 460/128 |
| 4,136,507 | 1/1979 | Hobbs | 56/126 |
| 4,162,811 | 7/1979 | Hobbs | 406/94 |
| 4,184,314 | 1/1980 | Hobbs | 56/372 |
| 4,257,486 | 3/1981 | Hobbs | 171/101 |
| 4,408,618 | 10/1983 | Witzel . | |
| 4,640,085 | 2/1987 | Rupprecht | 56/14.6 |
| 4,696,151 | 9/1987 | Hobbs | 56/14.6 |
| 4,951,451 | 8/1990 | Klinner | 56/16.5 |
| 5,001,893 | 3/1991 | Stanley et al. | 56/328.1 |
| 5,052,171 | 10/1991 | Bich et al. | 56/364 |
| 5,076,046 | 12/1991 | Schilling | 56/327.1 |
| 5,077,963 | 1/1992 | Harrison et al. | 56/327.1 |
| 5,077,964 | 1/1992 | Kabat | 56/327.1 |

FOREIGN PATENT DOCUMENTS

236092 5/1959 Australia .

Primary Examiner—Terry Lee Melius
Attorney, Agent, or Firm—Stevens, David, Miller & Mosher

[57] ABSTRACT

A peanut combine having a header for lifting peanut laden vines off the ground, an auger for distributing the peanut laden vines, a series of picking or thrashing cylinders for thrashing the peanut laden vines and a series of separator cylinders for removing the peanuts from the peanut laden vines. The separator cylinders include fingers which propel the vines and which rotate at a variable flailing speed. The fingers include tips which vary in angle with respect to the path which the fingers define as they rotate on the separator cylinders.

12 Claims, 8 Drawing Sheets

PEANUT COMBINE

RELATED APPLICATIONS

This application is a Continuation-in-Part of Application Ser. No. 599,038 filed Oct. 17, 1990, U.S. Pat. No. 5,138,826, the entire disclosure of which is hereby incorporated by reference.

BACKGROUND OF THE INVENTION

This invention relates generally to a peanut combine and more particularly to a straw separator system for such a combine. Peanuts grow underground and are attached to the roots of vines which are above the ground. A peanut crop is harvested by digging peanut laden vines from the ground, shaking as much dirt as possible from the roots, without detaching the peanuts and laying the peanuts on the ground in the windrows to dry. Digging machines place two rows in a single windrow, and the digger may be followed in a few hours by a side delivery rake which places two or three windrows into a single windrow. One commercially successful digger-shaker apparatus is described and claimed in my U.S. Pat. No. 3,319,720. After some drying in the fields, the peanut laden vines are picked up from the windrow and thrashed by a combine to separate the peanuts from the vines.

The character of peanut vines varies pronouncedly with the moisture content therein. When the vines are dry, they may be readily broken with a force of several ounces. When the vines are damp or when moisture is present, several pounds of force are required to break the vines. In threshing peanuts, the moisture content of the vines being supplied to the machine for separation of the peanuts varies over a wide range. In one area of a field where soil is light and vines are small, rapid drying occurs so the vines have a low moisture content. In other areas of the same field where the soil is heavier or in shaded areas or when the humidity is high, drying takes place at a much slower rate so the vines have a relatively high moisture content. Accordingly, in any windrow or area during the operation of the peanut combine, a wide variation of moisture conditions may be encountered. The volume of the vines in any given windrow varies when the vines are fed into a peanut picking machine, and the volume varies along with the moisture content of the vines. Peanut harvesting conditions additionally vary between different areas of the country. Climate conditions are relatively humid and cool in Virginia at peanut harvesting time, and very little wind blows except during a rainstorm. Heavy dew forms a night, and it is seldom that rain does not fall in a 5-day period. Peanuts are usually harvested within 10 days after they are dug. In contrast, climate conditions are relatively dry and hot in South Texas when peanuts are harvested. Skies are usually clear in general, but hot and dry and winds blow consistently. Little, if any, dew forms at night, and no light showers or rain falls on most windrows between the time peanuts are dug and when they are combined. In Virginia, ideal harvesting time is usually 7 days after digging, when under average weather conditions, normal average 20% moisture, vine juices and moisture have been absorbed or dried up, and vines are firm but not too tough to be torn apart without causing excessive peanut shelling. In contrast, in South Texas most peanuts are harvested when moisture content is around 5%, and vines are dry and brittle. The peanut combine is used to perform the operations of removing the windrows of peanut vines from the ground, picking the peanuts from the peanut vines, separating the peanuts from the peanut vines and bringing in the windrows, cleaning the peanuts and cutting the stems from the peanuts. This is accomplished by a header which removes the windrows from the ground, a picking cylinder which thrashes and transports the vines and a separator cylinder for removing the peanuts from the vine laden peanuts. Both the picking cylinder and the separator cylinder employ fingers for carrying the vines laden with peanuts. The angle which the tip of fingers make with respect to the path the fingers travel is a measure of the aggressiveness of the operation of the combine.

DESCRIPTION OF THE PRIOR ART

U.S. Pat. No. 4,640,085 to Rupprecht discloses cylinders which are close relative to their center shafts for preventing grain from being thrown through the downstream cylinders as they rotate counterclockwise. Fingers also propel the mixture of straw and small grain across concave separator grids which are set at negative angles to reduce aggressiveness. This prevents straw or other material from being carried over cylinders and reduce cylinder wrap which cause secondary thrashing and grain damage. This system is not acceptable in a peanut combine because excess shelling of the peanut would occur, and too much material, including peanuts, would be forced through a concave opening and the small openings would be plugged when vine type materials pass through the system.

U.S. Pat. No. 3,545,185 to C. Winfield et al discloses a pick up section which is winder than the thrashing and cleaning sections. The separating chambers employ fingers which travel at a uniform linear speed.

U.S. Pat. No. 4,408,618 to Witzel discloses fingers which may be retracted so as to swing between a generally radially extended position and a fully retracted stop position in which the axis of the fingers are inclined in the general direction of the housing axis in a downstream direction. Thus, as the rotor carries finger-like elements which intermittently penetrate and positively propel a portion of the mat without depressing the mat. The combination of the finger action and the rotor providing the desired axial displacement movement engages the mat and results in the displacement of the mat.

Figure 1:
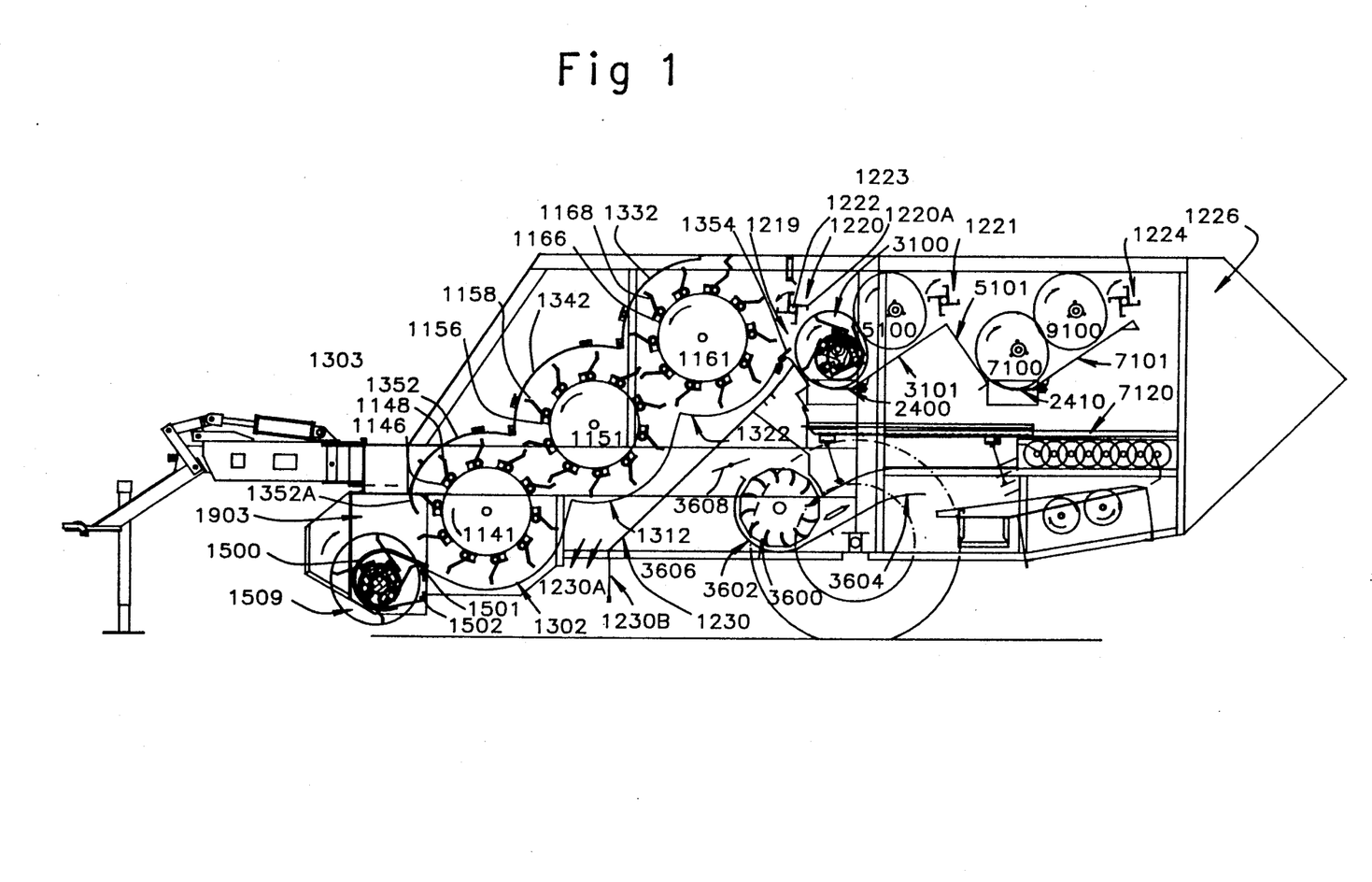
FIG. 1 is a side elevation view of an embodiment of the invention utilizing pairs of novel separating cylinders.
Figure 2:
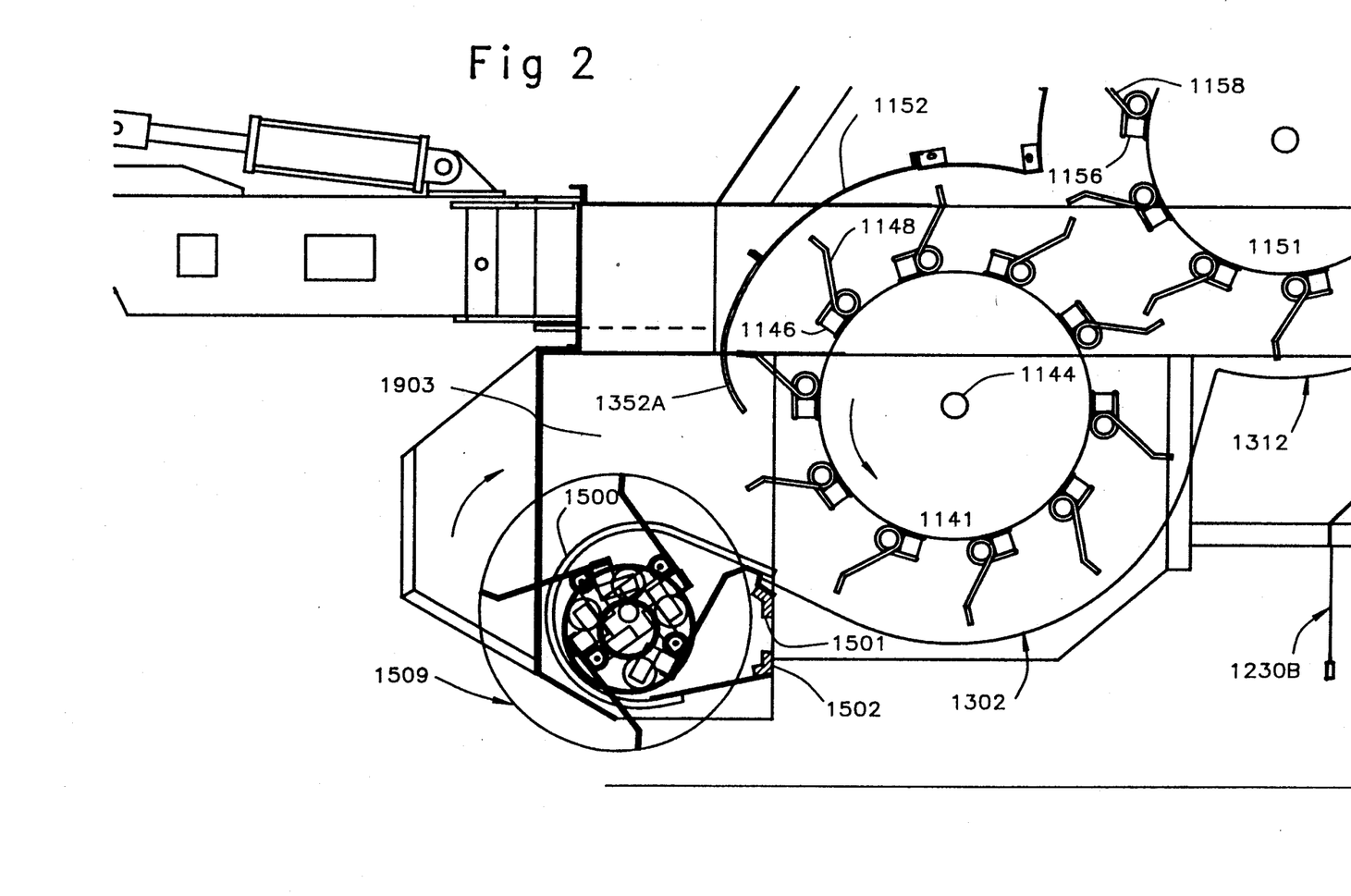
FIG. 2 is a side view of a picking cylinder utilized in the harvester depicted in FIG. 1.
Figure 3:
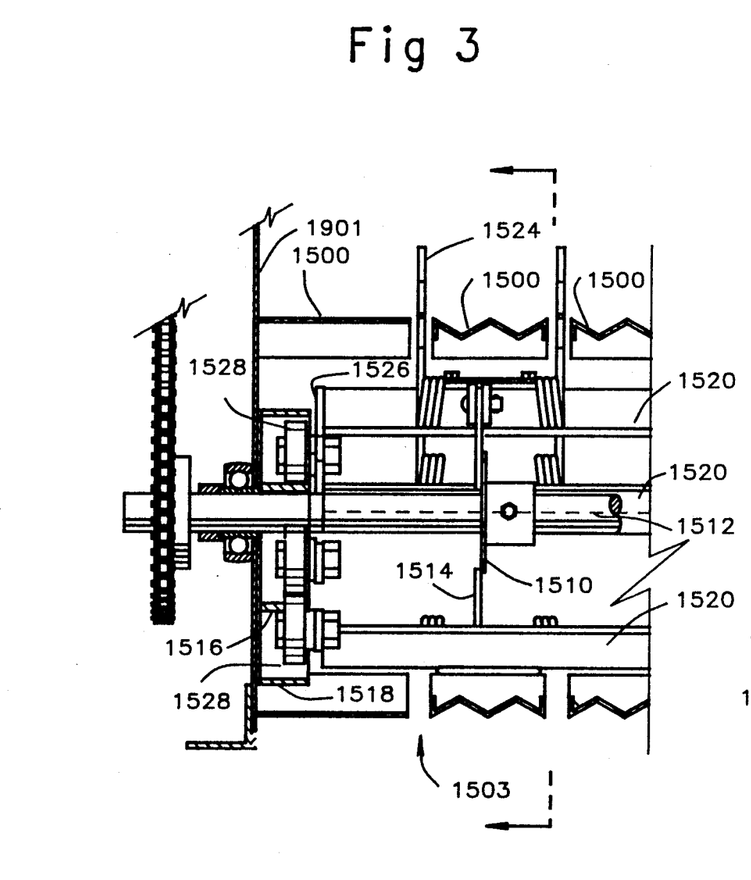
FIG. 3 is a front sectional view taken on line 3—3 of FIG. 4 of the header cylinder of the harvester of FIG. 1.

Australian patent specification 236,092 discloses in FIGS. 1 and 2 a riddle or rotor elements which convey straw to the rear of the machine while the grain falls through. If used with peanut laden vines, the vines would be broken, shredded or wrapped around the cylinder shaft.

U.S. Pat. No. 4,136,507 to Hobbs discloses a vine pick up cylinder or header which rotates and accelerates fingers between about 4 o'clock and 12 o'clock position and decelerates fingers at a much slower speed between 12 o'clock and 4 o'clock.

None of the above combines can achieve efficient separation of peanuts from their vines. Specifically, none of the above combines provides a separation cylinder which includes flexible fingers which change their angle with respect to the path and which rotate at various speeds.

In addition, the foregoing prior art does not provide a picking system where vine flow across the top of the picking cylinders is controlled in such a manner that flow velocity to the point between cylinders where vines are carded and peanuts stripped away is not impeded.

Peanut machinery is generally described in my previous patents. U.S. patents to Hobbs including U.S. Pat. Nos. 4,184,314, 4,257,486, 3,866,752, 3,667,599, 3,693,835, 3,968,626, 3,989,111, 4,696,151, 4,136,507 and 4,162,811 the disclosures of which are herein incorporated by reference in their entirety.

OBJECT OF THE INVENTION

It is an object of this invention to provide a peanut combine in combination with an improved separation system comprising a separator cylinder having a plurality of spring teeth to engage vines and allow peanuts, which are not restrained, to fall between the spring fingers to a board down which they slide to an opening. A series of cylinders is provided so that material carried over an upstream cylinder is propelled to downstream cylinders. As many cylinders are supplied as required to separate higher volumes of material. Each cylinder includes flexible fingers the tips of which vary in peripheral speed as they travel, and to provide opposing fingers which meet with controlled fingertip angles and relative velocity with respect to each other. The speed of one finger, at the highest velocity within its orbit, which is traveling upward is at a relative slow speed to avoid pitching the mat which contains peanuts and vines.

Additionally, it is an object of the invention to provide a flexible finger which changes its angle with respect to its path of travel so as to facilitate the removal of the vines from one cylinder and place them on another separator cylinder at speeds slow enough to allow peanuts to fall through each cylinder. A further object is to supply an aspirator cleaning system in combination with a shaker tray which can easily separate vines, leaves and other foreign material from the peanuts. In an additional embodiment of the invention, pairs of separating cylinders are utilized in conjunction with novel vine slides to provide a very compact and efficient combine.

SUMMARY OF THE INVENTION

The foregoing objects and others are accomplished in accordance with the invention, generally speaking by providing in a peanut combine having a header for lifting peanut laden vines from a windrow as the combine is towed thereover with an auger having a right and left screw to spread the peanut vines from the relatively narrow windrow across the entire width of the peanut combine. A typical picker system includes a series of three longitudinally spaced apart rotatable picker cylinders with the third cylinder being at a higher level above the ground than the first cylinder; each of the cylinders being disposed above smooth screens which permit dirt and other materials to drop out but retains any loose peanuts and also facilitates movement of a mat of vines thereover.

The picking cylinders (preferably three in number) have a series of vine flow guides and intercepting means disposed about the picking chamber which assists in directing a mat of peanut vines and peanuts to a series of two pairs of separating cylinders, which are in a separating chamber for separating the peanuts. The separator cylinders each have screens which are situated beneath each pair of cylinders.

Each separating cylinder includes a plurality of axially extending bars placed around the periphery of the cylinder and each bar carries a set of spring steel flexible fingers that are mounted on the bars to separate peanuts from the tangled mat of stripped vines and detached peanuts flowing from the picking chamber. The flexible fingers on one cylinder oppose comparable spring steel flexible fingers on another cylinder. The shaft of each separating cylinder is mounted off center in a track such that the cylinder, when rotated, defines an elliptical path. Therefore, the flexible fingers change angle with respect to the path which the tips of the fingers define, and the fingers move with varying speed to create an agitating action and prevent cylinder wrap as the mat from which detached peanuts are extracted is moved downstream.

A series of disk separators is provided in a cleaning chamber under the separator cylinders for cleaning the peanuts from other foreign material; a shaker tray is provided under the disk separators with a series of disk-shaped saws for separating dirt and other debris from the peanuts. A strong current of air is blown over the falling peanuts between the disk separator and the shaker tray to assist in separating the dirt and any vine stems remaining on the peanuts. The peanuts fall to a series of disk-shaped saws and a shaker table which remove any stems on the peanuts and for discharging the de-stemmed peanuts from the bottom of the combine. Specifically, the peanuts enter a peanut funnel from which the peanuts are transferred to storage.

BRIEF DESCRIPTION OF THE DRAWINGS

The above and other objects, advantages and features of the invention will be more fully understood when considered in conjunction with the following discussion and the attached drawings, of which.

DETAILED DESCRIPTION OF THE INVENTION

The general configuration of the peanut harvester of the present invention is shown and described in my co-pending Patent Application Ser. No. 599,038 the disclosure of which is hereby incorporated by reference in its entirety. In instances where parts are similar in Application Ser. No. 599,038 the same reference numeral is used here but is increased by an additional digit, thus numeral 150=1500.

Figure 4:
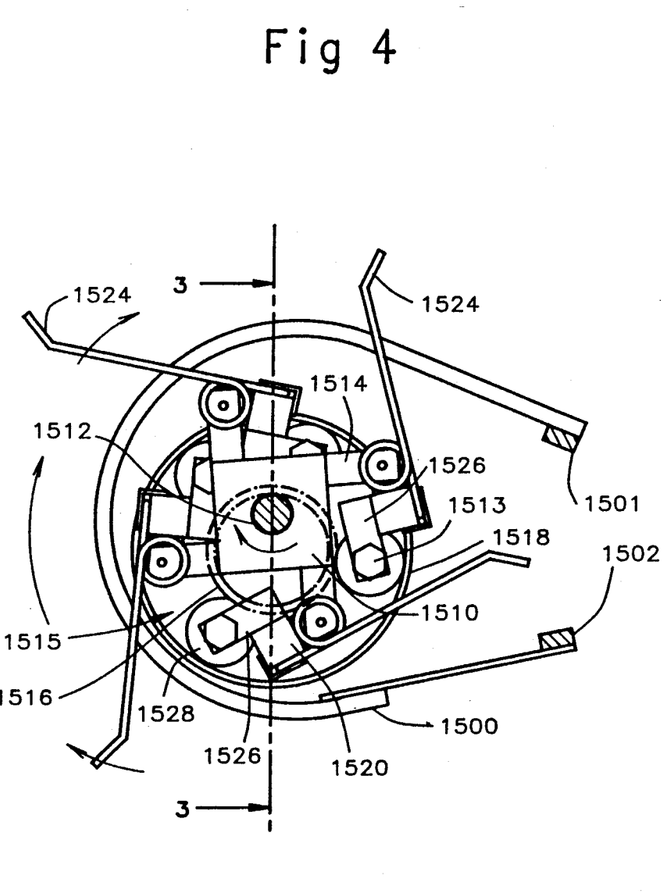
FIG. 4 is side view of the header cylinder illustrated in FIG. 3.
Figure 5:
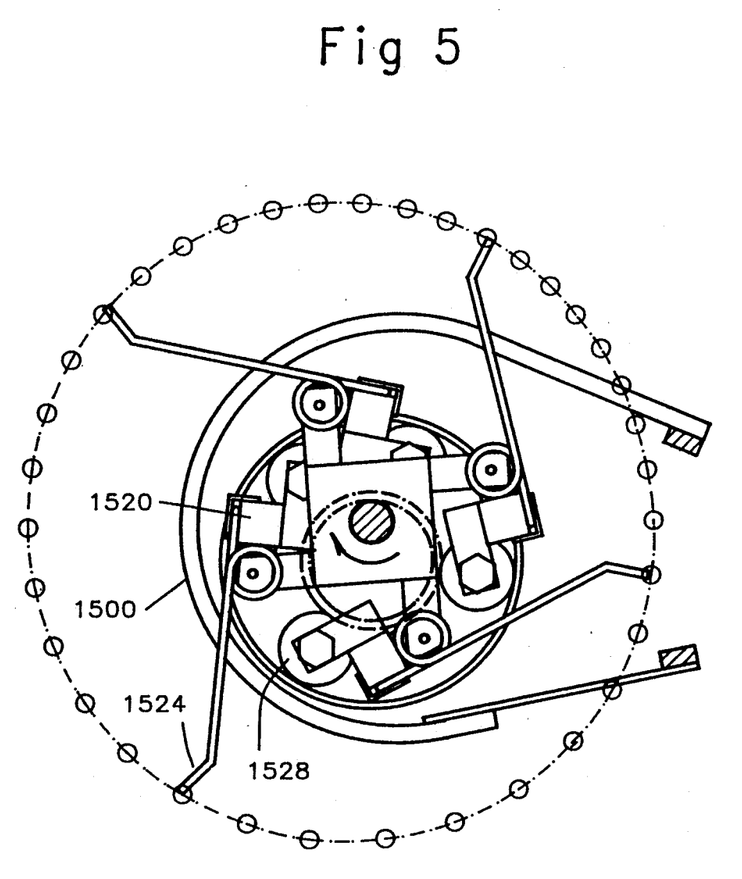
FIG. 5 is a diagrammatic side view of the header cylinder of FIG. 3 with a series of circles showing the circular path of rotation of the tips of the flexible fingers thereof.

As illustrated in FIGS. 1, 4 and 5, header cylinder or pickup cylinder, 1509 which rotates clockwise as viewed in FIG. 1, has partially surrounding it, a plurality of spaced stationary curved stripper plate 1500 welded at their ends to bars 1501 and 1502. Bars 1501 and 1502 are fixed at their ends to side walls 1901 and 1902 of the combine housing 1903, the arrangement being such that the header cylinder 1509 spans the width between the combine side walls 1901 and 1902. A plurality of stripper plates 1500 are spaced axially along the length of cylinder 1509 and have slots 1503 formed between adjacent plates and along a front opening in housing 1903. A shaft 1512 is journaled in side walls 1901 and 1902 and is enclosed by stripper plates 1500. A roller guide 1515 having radially spaced concentric rims 1516 and 1518 is fixed to the inner surface of each of the side walls 1901 and 1902, with rims 1516 and 1518 eccentrically enclosing shaft 1512.

The header or pickup cylinder 1509 further has a plurality of square plates 1510 (FIG. 4) fixed along the length of the shaft 1512 for rotation therewith. Each square plate 1510 has an arm 1514 fixed at each of its corners and projecting outwardly therefrom. As illustrated in FIG. 4, the arms 1514 are so disposed that one arm 1514 projects outwardly from each side of the square plate 1510. Since there are at least two square plates 1510 on shafts 1512, there are at least four pairs of arms 1514. A cross bar 1520 is attached to each pair of spaced apart arms 1514 and spans the distance between side walls 1901 and 1902. A bracket 1526 is fixed to the side of bar 1520 opposite the side from which bar 1520 is pivotally attached to arm 1514. A roller 1528 is journaled on a pivot point 1513 which is supported by bracket 1526 and is disposed between rims 1516 and 1518 which are fixed to respective side walls 1901 and 1902 and serve as a roller track for roller 1528 as shaft 1512 is rotated. Only one roller guide 1515 at each end of the shaft 1512 is required. The structure of the vine pickup cylinder adjacent to wall 1902 is therefore identical to the one adjacent wall 1901. As illustrated in FIG. 5, rollers 1528 and bars 1520 will follow an eccentric path in relation to stripper plate 1500 as shaft 1512 rotates due to the off-center mounting of the shaft 1512 within the roller guides 1515.

A plurality of flexible spring fingers 1524 are spaced along each bar 1520 in alignment with slots 1503 formed between stripper plates 1500. Fingers 1524 protrude through the slots 1503 to pick up vines from the ground under stripper plates 1500 and carry the vines in a clockwise direction over to and beyond the 12 o'clock position where the fingers are withdrawn and release the vines on the upper flat portion of stripper plates 1500.

Referring to FIG. 1, in this embodiment as the vine pickup cylinder or header 1509 rotatingly picks up the peanut vines, loose dirt falls to a first concave screen 1302. This screen is secured at its edges (not shown) to respective side walls 1901 and 1902 to span the width of the picking chamber 1303 beneath picking cylinder 1141. Vines and peanuts which fall onto the first concave screen 1302 are swept toward picking cylinder 1151 by the counterclockwise rotation of picking cylinder 1141. First concave screen 1302 is perforated to permit dirt to fall therethrough, with the perforations purposefully made too small for edible peanuts to pass therethrough.

As shown in FIG. 2, first picking cylinder 1141 spans the width between side walls 1901 and 1902 and has a shaft 1144 journaled in side walls 1901 and 1902 of housing 1903. A plurality of axially extending bars 1146 are circumferentially spaced apart around the periphery of the picking cylinder 1141. Each bar 1146 extends laterally between the combine side walls 1901 and 1902. Each bar 1146 carries a set of flexible fingers 1148 that are laterally spaced along bar 1146. Each set of fingers 1148 on one bar 1146 are staggered with respect to those on an adjacent bar 1146 so that no one set of fingers 1148 on one bar 1146 follows the same path at the set on an adjacent bar 1146 as the cylinder rotates.

Picking cylinder 1141 is disposed above a first concave screen 1302, which is partially concentric therewith, and which spans the distance between walls 1901 and 1902. The spacing between cylinder 1141 and first concave screen 1302 is such that fingers 1148 will contact peanut vines lying on first concave screen 1302 and a second concave screen 1312 (described below) as cylinder 1141 is rotated in a counterclockwise direction, which action moves the peanut vines over first concave screen 1302.

Figure 10:
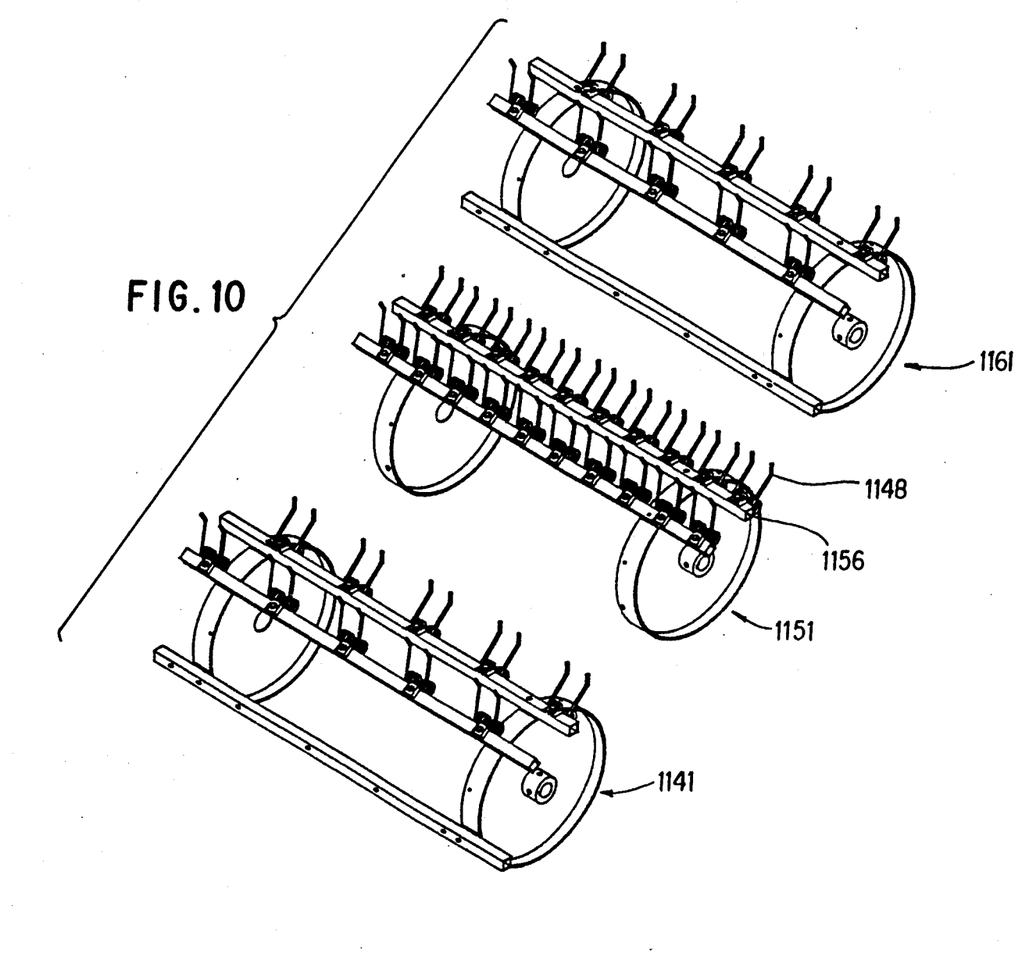
FIG. 10 is a diagrammatic perspective view showing three picking cylinders, each with only two bars in place for the sake of clarity.

A second picking or thrashing cylinder 1151 is disposed above and behind (downstream) first picking cylinder 1141. Second picking cylinder 1151 is disposed above a second concave screen 1312 which is attached at its edges to respective side walls 1901 and 1902 to form an arc which is partially concentric with the cylinder 1151. Second picking cylinder 1151 is identical in form and construction to the first picking cylinder 1141, with the exception that in this particular embodiment, there are a larger number of flexible fingers 1148 and they are disposed on bars 1156 in a staggered fashion such that the flexible fingers on the second picking cylinder 1151 alternate with the flexible fingers on the first picking cylinder. Preferably there are twice as many flexible fingers 1148 or 1158 on second cylinder 1151 as on first cylinder 1141. In one embodiment double torsion springs, each with fingers at two and one-half inch center distance, are mounted on ten inches centers on the bars 1146 and 1166 of the first and third picking cylinders and on five inch centers on bars 1156 of the second cylinder. This relationship is shown diagrammatically in FIG. 10.

Second picking cylinder 1151 is spaced longitudinally in combine 1903 so that fingers 1158 are above the second concave screen 1312. As fingers 1158 pass thereover, they will move vines over the second screen 1312 as cylinder 1151 is rotated to allow dirt and other debris to fall through the perforations (not shown) formed in second concave screen 1312.

A third picking cylinder 1161 is located above and behind (downstream) of the second picking cylinder 1151 and is identical in form to first picking cylinder 1141. The third picking cylinder 1161 is also rotated counterclockwise but at a faster rotational speed than the second picking cylinder 1151. Third picking cylinder 1161 is disposed in a spaced relationship above a third concave screen 1322 attached at its edges to a respective side wall 1901 and 1902 and is partially concentric with the third picking cylinder 1161. Material flowing under cylinder 1161 moves at 1,817 feet per minute compared to average flow across separator cylinders 3100, 5100, 7100, 9100 at approximately 375 feet per minute when the machine is operated at ASAE standard PTO speed. The third concave screen 1322, like first and second concave screen 1302 and 1312, includes perforations (not shown) to allow dirt and debris, but not peanuts, to fall through. Third concave screen 1322 laterally abuts concave screen 1312 which likewise abuts concave screen 1302 to correspondingly form a continuous series of screens to allow dirt and other debris to fall through but retain peanuts and vine material. Each picking cylinder operates at sufficient speed to cause peanuts to be detached from vines by vine snatch and whip produced by sudden changes in vine flow speed and direction plus the stripping action as the vines are carded between picking cylinders. The smooth connection from one concave screen to the other and absence of large screen openings in the rear concave leads to a lack of vine drag.

This lack of drag facilitated by the series of concave screens allows the vine material flowing across a gap 1219 and a peanut vine re-run control board 1354 to be very smooth and consistent. The re-run control board 1354 regulates the amount of peanut vine which is allowed to pass onward to a first separating chamber 1223 (described below) from the series of picking cylinders. That is, the control board is positioned so that if the vines, after traversing under the third picking cylinder have no peanuts attached or they are broken to a sufficiently short length, then such vines will easily pass over the top edge of the control board and move into the area of the separating chamber 1223.

On the other hand if the vines, after traversing past the first, second and third picking cylinders have peanuts attached, the inertia of which propel them past stripper cylinder 1220, or vines are still too long relative to the setting of control board 1354 to be discharged from the picking chamber for proper working by the separating cylinders, then these vines will flow up past first doffer 1220. Vines which flow up passed doffer 1220, which is driven to rotate in a counterclockwise direction, will be turned to the left as seen in FIG. 1 so that they will again be in contact with the fingers of third picking cylinder 1161 and thus re-routed to tend to go back down past the second and first picking cylinders where they are carded again between cylinders.

The path followed by vines which are re-routed back over the picking cylinders by the action of re-run control board 1354 (described below) is accurately controlled by a series of curved picking cylinder covers 1332, 1342, and 1352, disposed in a spaced relationship over picking cylinders 1161, 1151, and 1141 respectively. The curved cylinder covers extend the width of the combine between side walls 1901 and 1902 and are fixed at each side edge to a respective side wall. When the re-run control board, as adjusted, directs peanut vine material back into the picking chamber for further processing, vine material is swept back across the picking cylinders in a smooth and constant flow until it is acted upon by downstream picking cylinders. Vines which flow back over the first picking cylinder 1141 are directed by a vine guide 1352A (FIG. 2) which extends across the width of the picking cylinder 1141 in a continuous sheet. Peanut vine overflow falls on the incoming vine windrow several inches behind the pick-up cylinder or header 1509.

To prevent vine wrap, vanes 1220A of doffer 1220, as well as those on 1221 and 1224 are designed with negative rake relative to the direction of vine flow around or across cylinders which they are intended to strip. Velocity at the perimeter of cylinder assembly 1161 is twice that of doffer 1220.

Picking cylinder 1161 rotates at sufficient speed to create enough inertia to cause material being carried by that cylinder to tend to travel in a comparatively straight line when no longer restrained by concave screen 1322. The angle of re-run control board 1354, which directs the path of material leaving concave screen 1322 is adjustable. Flow of that material, therefore, can be directed so as to contact doffer 1220, which rotates counterclockwise, over a range from bottom center where, relative to direction of material flow, the angle of vanes 1220A is very aggressive, to a forward point where, material with adequate inertia, will pass the doffer without touching. As the point at which the material comes in contact with doffer 1220 moves forward, the angle of vanes 1220A, relative to material flow, is decreased and less material is passed under the doffer through opening 1219 to the vine separator chamber. Material allowed to pass in front of doffer 1220 flows back to the picking chamber for further processing.

Long flexible vines are carded between cylinders 1151 and 1161 where those being carried across concave 1322 become hooked or draped over spring fingers 1168 of cylinder 1161. They trail the finger to which they are hooked in string-like manner and unless broken away, drag is reduced or drag angle relative to cylinder center is increased, centrifugal force does not cause them to be released as they are moved past opening 1219.

When re-run control board 1354 is set at the angle shown in FIG. 1, drag is reduced when that portion of a long vine being urged against concave 1322 by centrifugal force clears the lower edge of 1354. If too long to be released before the hooked end is past doffer 1220, whip action may cause the doffer to create drag which will break off a portion of the tail or cause the vine to break away from the finger to which it is hooked. Should it pass above the doffer, it will be carried back to the picking chamber by cylinder 1161 where it will be stripped and broken down short enough to be released and passed through opening 1219 when it is again presented for classification.

Short vine sections, with no peanuts attached to provide inertia to carry them firmly against doffer 1220, are swept along over concaves in disoriented alignment without becoming draped over spring fingers 1168. They are free to leave the influence of cylinder 1161 at the first point where their paths are not controlled concentrically by the spring fingers.

When operating under extremely dry conditions, vines are stiff and break easily, therefore, they will not drape around spring fingers 1168 and be hooked. Peanuts which do not become detached when cylinder 1141 snatches the vines away from the header are stripped from the vines as they are carded between cylinders. Since dry peanut vines leave jagged ends and limb stubs when broken, they have a greater tendency to cling and mat together. Unless they are subjected to drag such as that which openings large enough to allow peanuts to fall through a concave preceding and adjacent control board 1334 would create, they flow across opening 1219 smoothly and those vines with peanuts attached are rerouted to the picking chamber for further processing while those with no peanuts attached are discharged to the vine separator.

Though vine conditions, the presence of foreign material, improper adjustment or operation of the machine of the present invention and other variables cause material flow and performance to be affected, each processing section of the machine has the versatility and capacity to assimilate the difference and operate efficiently under virtually all conditions where peanut combines are used.

A dirt slide 1230 under screens 1312 and 1322 accepts dirt and other loose materials which has fallen through slotted screens 1312 and 1322, and guides this dirt and debris to an opening 1230A in the bottom of the picking chamber. From this opening, the dirt and debris leaves peanut combine housing 1903 and falls to the ground. An end of the dirt slide 1230 under picking cylinder 1171 is attached to a curtain 1230B which is disposed vertically below the machine to discourage rearward movement of said dirt and to allow any dirt and debris that has accumulated on dirt slide 1230 to slide to outside the peanut combine.

As shown in FIG. 1 the improved separating chambers of this embodiment of the present invention removes peanuts from their vines by utilizing novel twin pairs of separating cylinders (described below), each pair of separating cylinders having one cylinder elevated and downstream of the other cylinder of that pair. A first pair of separating cylinders is followed by doffer cylinders 1221 (described below). A second pair of separating cylinders, located downstream of the first pair of separating cylinders is also followed by a doffer cylinder 1224. The separating cylinders are rotated in the opposite direction of the picking cylinders, that is, clockwise in the embodiment as shown in FIG. 1.

Figures 6, 7:
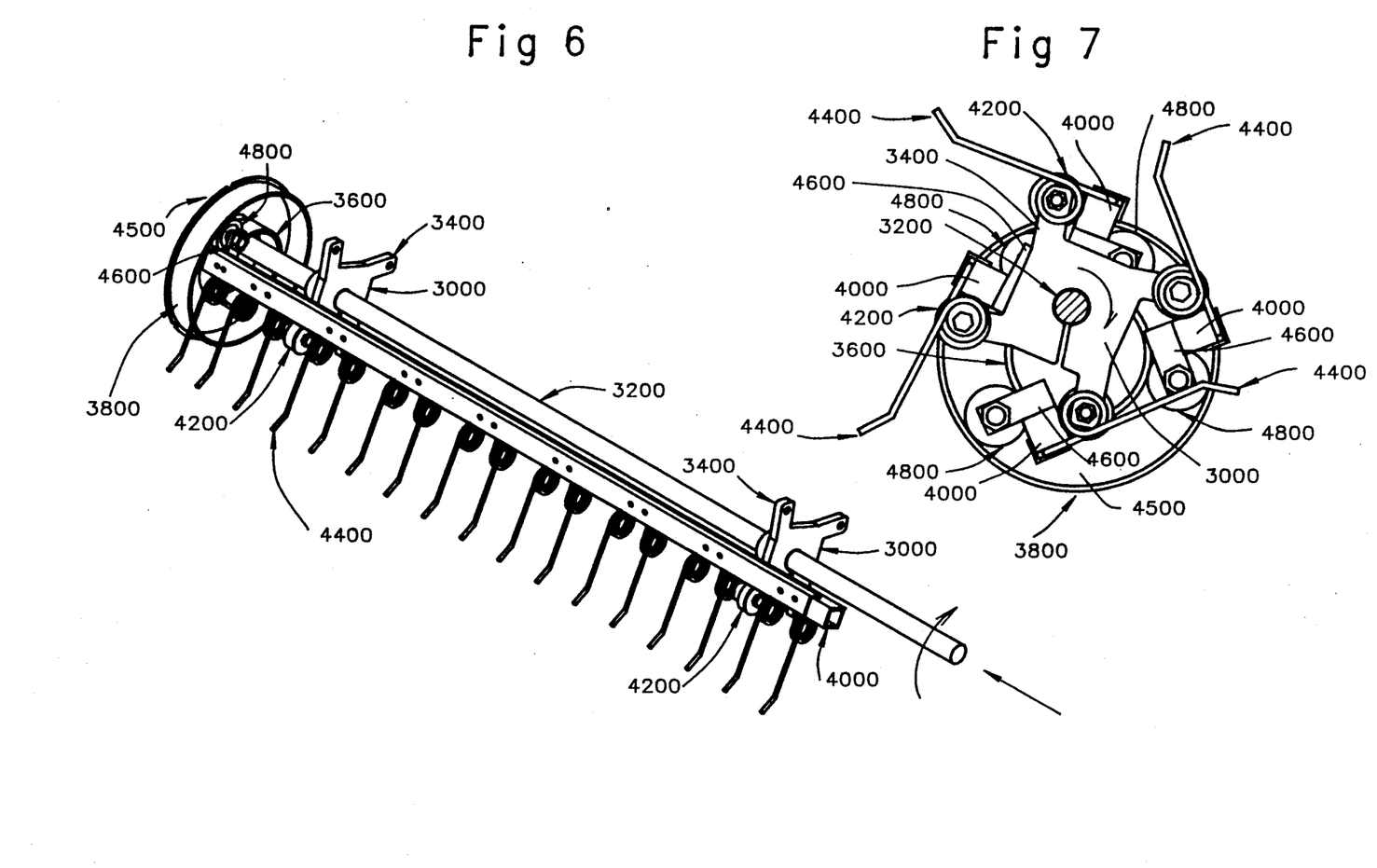
FIG. 6 is a perspective view of a portion of the novel separating cylinders of the peanut harvester of FIG. 1.
FIG. 7 is a side view of a complete separating cylinder using four of the bars shown in FIG. 6.

The novel separating cylinders and doffers of the invention will now be described. As illustrated in FIGS. 6 and 7, first separator cylinder 3100 includes a shaft 3200 which is journaled at its ends in side walls 1901 and 1902 within the space enclosed by the separator chamber 1223. A roller guide 4500 having radially spaced rims 3600 and 3800 is fixed to the inner surface of the side walls 1901 and 1902 with rims 3600 and 3800 and is eccentrically mounted in relation to a shaft 3200. The shaft 3200, when rotated within the roller guides 4500, creates an elliptical or agitating action as described below.

A plurality of square plates 3000 are fixed to shaft 3200 for rotation therewith. The center of each square place is substantially aligned with the center of shaft 3200. Square plates 3000 each have an arm 3400 fixed at each of its corners which projects outwardly therefrom as illustrated in FIG. 7. The arms 3400 are so disposed that one arm 3400 projects outwardly from each side of the square plate. A cross bar 4000 is pivotally attached to each pair of spaced apart square plates 3000 at arms 3400 and spans across the width of the separator chamber. A pivotal arm 4200 is fixed at one of its ends to each crossbar 4000 and is pivotally fixed at its other end to each of arms 3400. A bracket 4600 is fixed to the opposite side of bar 4000. As shown in FIG. 2, 6, and 7, flexible fingers 4400 move in an eccentric path due to the elliptical mounting of the shaft 3200 within the roller guides 4500, as described above. When viewed from either end of the shaft 3200, the angle which a flexible finger tip makes with respect to the path changes as the shaft 3200 moves along its rotational path. As seen in FIG. 7, as the tip rotates with the shaft, at a position which ranges from approximately 3 o'clock to approximately 11 o'clock the angle created by the tip is substantially perpendicular to the path, yet from 11 o'clock to 3 o'clock the angle is less than 90°. This novel change in aggressiveness and finger tip speed makes full use of the rip and agitating action created by the elliptical mounting of the shaft 3200, eliminates cylinder wrap and enables detached peanuts mixed with the shredded or carded vines to more easily fall away through and between cylinders and their components.

A second separating cylinder 5100 is located downstream of first separating cylinder 3100 and is situated such that it is higher in elevation than first separating cylinder 3100 to form a pair of separating cylinders. The construction of second separating cylinder 5100 is identical to first separating cylinder 3100. First and second separating cylinders 3100 and 5100 are in a spaced apart relationship such that flexible fingers 4400 on each separating cylinder interdigitate with each other when the separating cylinders are rotated. As the peanut laden vines travel over separator cylinder 3100, the vines are of a size that a mat is formed, and this mat is agitated and torn apart allowing restrained peanuts to fall free. The mat can be a continuous band of vines which extend between walls 1901 and 1902.

Figure 8:
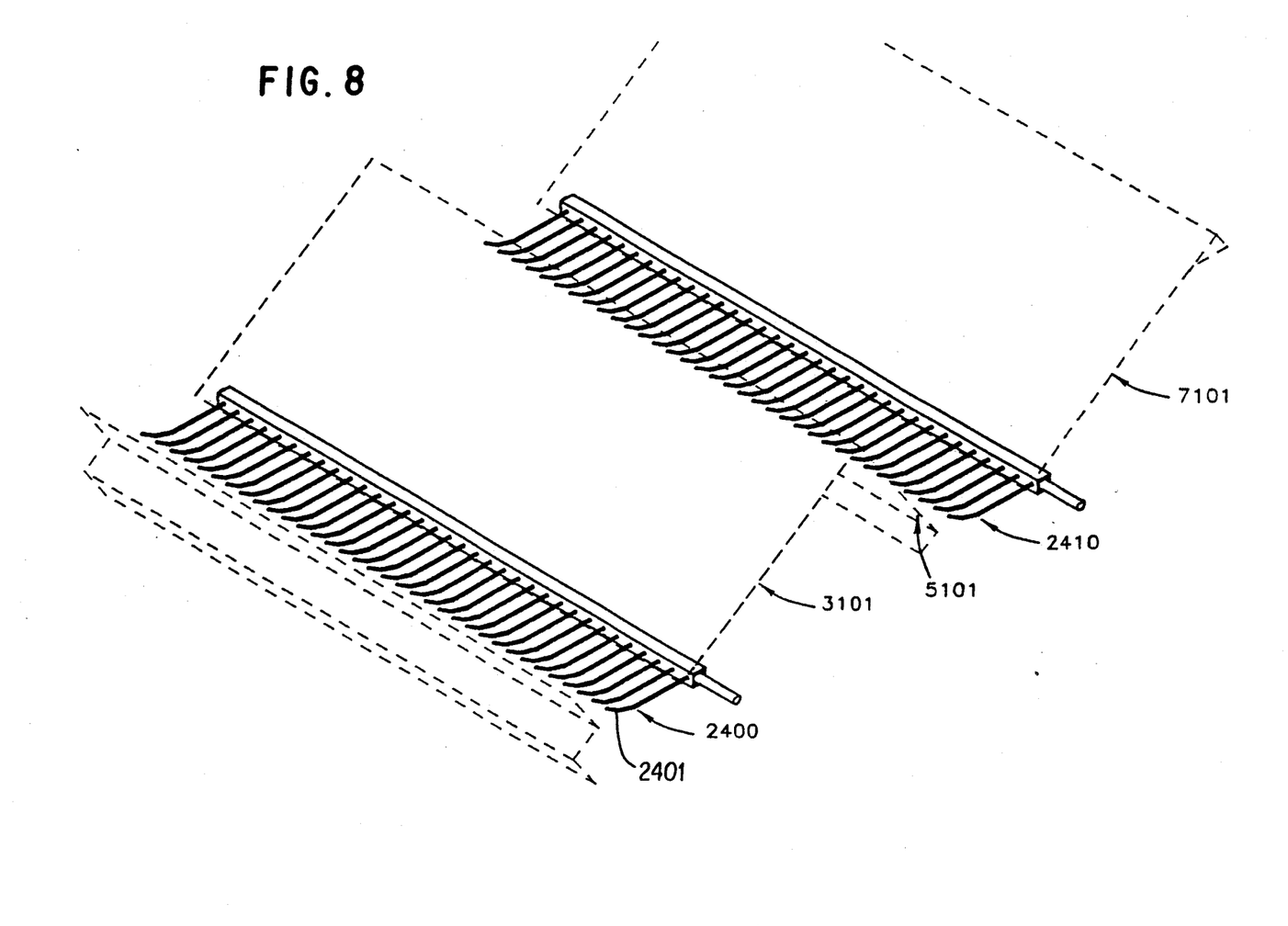
FIG. 8 is a perspective view of two finger screens used in the peanut harvester shown in FIG. 1; the lower separating cylinder sides are also shown.
Figure 9:
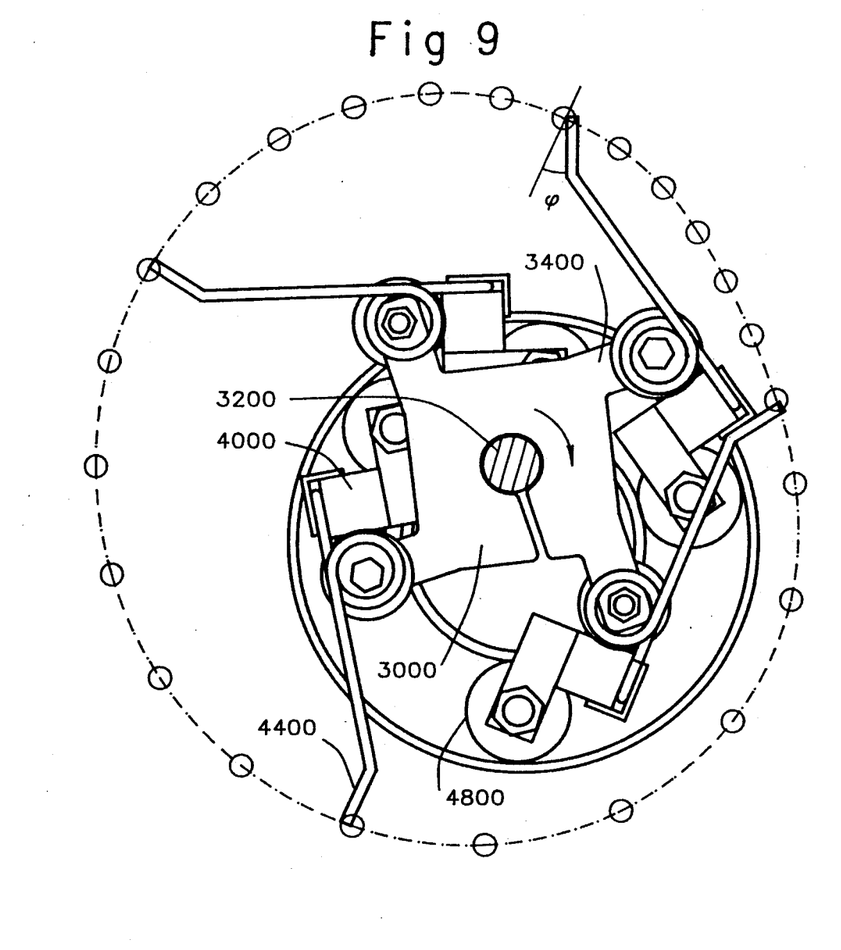
FIG. 9 is a side view, similar to FIG. 6 but of a separating cylinder with the tips of the fingers following an elliptical path.

While being acted upon by the first pair of separating cylinders 3100 and 5100, short sections of vine and peanuts pass through the cylinders onto a first vine slide 3101 whereby the short vine segments and peanuts are directed to finger screen 2400. Vine segments rejected by screen 2400 are carried by fingers 4400 back over the first separating cylinder 3100 where, due to their irregular surfaces, some become entangled with incoming vines and are carried along until they are discharged from the machine. Screens 2400 are continuously swept clean by fingers 4400 and screening efficiency is not impaired if short vines are returned, rejected and must be put back into the incoming vine mat many times before they are discharged over doffer 1221 which strips the vines from cylinder 5100. Vine slide 3101 is a continuous sheet attached by its side edges (not shown) to side walls 1901 and 1902. Vine slide 3101 is disposed at approximately a 30 degree angle from the horizontal in a spaced relationship beneath the first pair of picking cylinders. Prior to passing over first separating cylinder 3100 another time, the short vine segments are passed over first finger screens 2400 (FIG. 1). As shown in FIG. 8, finger screens 2400 include spaced apart tines 2401 attached to a pivot arm 2402. Pivot arm 2402 spans the width between combine walls 1901 and 1902 and is spring mounted (not shown) at each end to a respective side 1901, 1902 of the combine.

Should large rocks, bricks, metal, or other foreign material pass under the first pair of separating cylinders the finger screens 2400 are mounted to swing downward, away from the separating cylinders, to allow the large foreign material to fall away. The finger screen 2400 is spring biased to then resume their normal position.

Peanuts separated from the vines fall through spaced apart tines 2401 of finger screen 2400 onto a separator system 7120 (described below). Longer vines are passed from second separator cylinder 5100 by second doffer 1221, identical in construction to first doffer 1220 but is driven to rotate clockwise. The longer vines are fed to a second separating cylinder pair which includes third and fourth separating cylinders 7100 and 9100 via a second vine slide 5101. Third and fourth separating cylinders are located downstream of the first separating cylinder pair. The third and fourth separating cylinders rotate in the same clockwise direction as the first separating cylinder pair. Vine slide 5101 is disposed in a downward direction so as to be generally perpendicular to the first vine slide 3101. The shaft of the third separating cylinder 7100 is in substantially the same horizontal plane as the shaft 3200 of the first separating cylinder 3100. The shaft of the fourth separating cylinder 9100 is in substantially the same horizontal plane as shaft of the second separating cylinder 5100.

Vines, foreign material and any peanuts which were not separated when the mat was acted upon as it traversed the first pair of separator cylinders are stripped from cylinder 5100 by doffer 1221 which rotates clockwise and are passed to third and fourth separating cylinders 7100 and 9100. Spring finger tips are at their least aggressive angle and moving at the lowest velocity during their orbit as they pass doffer 1221. Second vine slide 5101 serves as a front housing for the second pair of vine separator cylinders and guides material to cylinder 7100.

Any short vine segments and peanuts which were not separated previously, fall through third and fourth separating cylinders 7100 and 9100 onto a third vine slide 7101 disposed beneath the third and fourth separating cylinders and over second finger screen 2410. Second finger screen 2410 is identical in construction to first finger screen 2400 and allows separated peanuts, as well as some small foreign material to pass therethrough, as described above. Short vine segments rejected by finger screen 2400 are then rerouted over third separating cylinder 7100 for further action as described above in the first pair of vine separator cylinders. Longer vine segments are then passed beyond fourth separating cylinder 9100 by a third doffer 1224. Third doffer 1224 is identical in construction to the second doffer 1221 and also rotates clockwise. Third doffer 1223 rotatingly passes vine and vine segments out of the vine separator chamber and to the ground through wind and weather hood 1226 for eventual disposal.

It should be realized that the flow of material under cylinder 1161 as it is presented to the clarification elements is of substantial volume. Perimeter speed of cylinder 1161 is approximately twice that of doffer 1220 which is also less aggressive. Material which may hesitate or be deflected in front of the doffer will be engaged by spring fingers following the ones which originally propelled it against doffer 1220 and carried away. Interference between peanuts and other materials plus other factors are also involved which make it necessary to set control board 1354 so that some vines which have no peanuts attached will be routed over cylinder 1161 for further processing to assure that no vines are discharged with peanuts attached. The smooth flow of vines across cylinder 1141 helps to cushion peanuts and sweep those which have been detached across each of the concaves at constant velocity relative to cylinder speeds even when no windrow is being fed into the machine.

As described above, this embodiment of the invention utilizes two pairs of separating cylinders for removing peanuts from the vines. As can be appreciated, as the number of separating cylinder pairs are increased, a greater number of peanuts can be separated from a greater volume of vines, and correspondingly a fewer number of peanuts are discarded. Research has revealed that utilizing two such pairs of separating cylinders, positioned as shown and described, yields an efficient and compact novel peanut combine that is low in height and will operate efficiently over a volume range of vines and foreign material to peanuts from more than fifty to one to as low as one to one.

Peanuts leave the separator chambers only through spring finger screens 2400 or 2410; the peanuts, many of which still have the stems through which they were nourished attached, then drop into a cleaning chamber for cleaning of all foreign material from the individual peanut. The cleaning chamber includes a disk separator and associated apparatus as described in relation to other embodiments of the invention. In the alternative, the separation system disclosed in U.S. Pat. No. 4,696,151 (incorporated herein in its entirety by reference) may be utilized.

As previously mentioned, a strong current of air is used to separate the peanuts from fine particles of vine and dirt. This air current is supplied by a fan 3600 having a housing 3602 and a discharge duct 3604 leading to the underside of disk separator 7120. Intake air for fan 3600 is drawn up from the bottom of the machine through an inlet duct 3606 which is in the shape of an inverted funnel with a wide opening at the bottom of the inlet and a progressively small cross-sectional area going upwardly therefrom. The purpose of this inverted funnel is to have a low air velocity at the inlet duct entrance to decrease the tendency of drawing in trash, dirt and dust particles that may be stirred up by the machine operating in the peanut field. The previously mentioned curtain 1230B is positioned between the dirt discharge 1230A and the air intake 3606 so as to virtually eliminate screened material being drawn into the inlet duct. Part way up inlet duct 3606 is an inlet air control valve 3608 which is pivotal like a damper to vary the quantity of air reaching the fan 3600.

Greater efficiency and capacity of the vine separator allows much less vine and foreign material to flow with peanuts to the disk separator. All systems within the machine "combine" to produce better efficiency and capacity. When operated in the same field with other peanut combines and performance of each machine is analyzed, evidence of the superior efficiency of the present invention is readily apparent. Considering all factors, applicant believes that this design is clearly superior to other designs.

Although the invention has been described in detail for the purpose of illustration it is to be understood that such detail is solely for that purpose and that those skilled in the art can make variations therein without departing from the spirit and scope of the invention except as it may be limited by the appended claims.

I claim:
1. A peanut combine for thrashing peanuts from their vine comprising:
 a combine body including first and second spaced apart side walls defining a flow path through said body;
 a rotatable header cylinder for receiving cut peanut vines from the ground;
 a first picking cylinder rotatably mounted between said first and second walls for carrying the peanut vines from the header and for separating peanuts from the peanut vines;
 a second picking cylinder rotatably mounted between said first and second walls for receiving peanut vines from said first picking cylinder and for separating peanuts from said peanut vines;
 a third picking cylinder rotatably mounted between said first and second walls for receiving peanut vines from said second picking cylinder and for separating peanuts from their vines, said first, second and third picking cylinders being located in said flow path downstream from each other with the third picking cylinder being at a higher elevation above the ground than the first picking cylinder;

first, second and third concave screens each disposed in a spaced relationship respectively beneath said first, second and third picking cylinders in a lengthwise direction;

first, second and third covers each disposed in a spaced relationship over each said picking cylinder in a lengthwise direction;

said header cylinder and said picking cylinders being positioned and rotated for routing peanut vines from said header cylinder to said first picking cylinder over said first concave screen and beneath said first picking cylinder to beneath said second picking cylinder over said second concave screen and to beneath said third picking cylinder over said third concave screen;

vine control means for routing selected ones of said peanut vines from beneath said third picking cylinder over a top of said rotating third picking cylinder and into a space between said third picking cylinder and said third cover;

a first doffer means downstream of said third picking cylinder;

a first pair of rotatable separating cylinders disposed downstream from said third picking cylinder, said first pair of separating cylinders comprising a first separating cylinder disposed in substantially the same horizontal plane as said third picking cylinder and a second separating cylinder downstream of said first separating cylinder and at a higher elevation with respect to the horizontal than said first separating cylinder;

said first doffer means being positioned to route said selected ones of said peanut vines from beneath said third picking cylinder to said first pair of separating cylinders;

a second doffer means downstream of said first pair of separating cylinders;

a second pair of rotatable separating cylinders downstream of said second doffer means and comprising a third separating cylinder disposed in substantially the same horizontal plane as said first separating cylinder and a fourth separating cylinder downstream of said third separating cylinder and disposed at a higher elevation with respect to the horizontal than said third separating cylinder;

vine slide means for routing peanut vines beneath said first and second pairs of separating cylinders;

said second doffer means being positioned to route first selected ones of said peanut vines from said first pair of separating cylinders to said second pair of separating cylinders, the arrangement being such that peanut vines not so selected are routed to go back again beneath said first pair of separating cylinders;

said vine slide means further comprising spaced apart tine means for allowing peanuts separated from their vines to fall therethrough; and a third doffer means positioned to accept said first selected vines from said second pair of separating cylinders and routing said second selected vines downstream of said third doffer means, the arrangement being such that vines not so selected are routed to go back again beneath said second pair of separating cylinders.

2. The peanut combine of claim 1, wherein at least one of said separating cylinder comprises:
   a shaft mounted for rotation and disposed transversely between said first and second side walls;
   a pair of spaced apart substantially circular rim supports, each said rim support being fixedly attached respectively to each of said walls, each said rim support comprising substantially circular inner and outer rims that define a track, means for mounting said shaft at a position offset from a center axis of each substantial circular rim support;
   a plurality of rollers disposed in each said track;
   a plurality of cross bars each having first and second ends, said first ends each being pivotally attached to a roller disposed in one of said rim supports of said pair; said second ends of said cross bars each being pivotally attached to a roller disposed in the other of said rim supports of said pair;
   a plurality of flexible fingers mounted upon each of said plurality of cross bars in a spaced apart relationship along length of each cross bar;
   whereby when each said separating cylinder is rotated, said plurality of flexible fingers define an eccentric path of travel when viewed from an end of said shaft.

3. A peanut combine as in claim 2, including at least two plates secured to rotate with said shaft, each said plate having a plurality of mounting means for mounting an arm that is correspondingly mounted on a cross bar.

4. A peanut combine as in claim 2 wherein said plurality of fingers each comprises a spring having a portion bent at an angle at an end thereof.

5. A peanut combine as in claim 2 wherein said plurality of fingers disposed on said cross bars are arranged to cover the entire width of said cylinder by being axially spaced apart by predetermined distances for each said cross bar.

6. The peanut combine of claim 1 wherein at least one of said first, second and third concave screens is perforated.

7. The peanut combine of claim 1 wherein said vine slide means further comprises means for allowing peanuts separated from said peanut vines to fall therethrough.

8. The peanut combine of claim 1 wherein said vine slide means further comprises finger screen means for allowing material heavier than said peanut vines to fall therethrough.

9. The peanut combine of claim 8 wherein said finger screen means comprises a plurality of spaced apart tines.

10. The peanut combine of claim 9 wherein said finger screen means comprise means for spring mounting said plurality of spaced apart tines to said first and second spaced apart walls of said peanut combine.

11. The peanut combine of claim 10 wherein said finger screen means comprise an array of said spaced apart tines, said array having first and second ends pivotally mounted to said first and second walls of said peanut combine, respectively.

12. A peanut combine for thrashing peanuts from their vine comprising: ,
   a header cylinder for receiving cut peanut vines from the ground;

a first rotatable picking cylinder for carrying the peanut vines from the header and for separating peanuts from the peanut vines;

a second rotatable picking cylinder for receiving peanut vines from said first picking cylinder and for separating peanuts from said peanut vines;

a third rotatable picking cylinder for receiving peanut vines from said second picking cylinder and for separating peanuts from their vines, each said first, second and third picking cylinders being located downstream from each other with the third picking cylinder being at a higher elevation above the ground than the first picking cylinder;

first, second and third concave screens each disposed respectively in a spaced relationship beneath each said first, second and third picking cylinder in a lengthwise direction thereof;

first, second and third covers each disposed respectively in a spaced relationship above each said first, second and third picking cylinder in a lengthwise direction thereof;

said header cylinder and said first picking cylinder being positioned and rotated to cause routing of peanut vines from said header cylinder to said first picking cylinder over said first concave screen and beneath said first picking cylinder to beneath said second picking cylinder and over said second concave screen and to beneath said third picking cylinder and over said third concave screen when said first, second and third picking cylinders are rotated;

vine control means for routing selected ones of said peanut vines from beneath said third picking cylinder over a top of said rotating third picking cylinder and into a space between said third picking cylinder and said third cover; and a series of substantially identical pairs of separating cylinders downstream from said first, second and third picking cylinders, said pairs of separating cylinders being positioned downstream from each other, each said pair of separating cylinders comprising a first separating cylinder disposed at generally the same elevation as said third picking cylinder and a second separating cylinder downstream of said first separating cylinder and at an higher elevation than said first separating cylinder.

* * * * *